United States Patent
Misono et al.

[11] Patent Number: 5,812,302
[45] Date of Patent: *Sep. 22, 1998

[54] HIGH-SPEED FREQUENCY MODULATION SIGNAL SOURCE AND HIGH-SPEED VARIABLE OPTICAL WAVELENGTH FILTER

[75] Inventors: Masatoshi Misono; Naoya Henmi, both of Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 582,534

[22] Filed: Jan. 3, 1996

[30]  Foreign Application Priority Data

Jan. 5, 1995 [JP] Japan ................................ 7-000303

[51] Int. Cl.⁶ ................................ G02F 1/11; G02F 1/33
[52] U.S. Cl. ............................................ 359/287; 359/308
[58] Field of Search ................................ 359/287, 308

[56] References Cited

U.S. PATENT DOCUMENTS

| 3,644,015 | 2/1972 | Hearn | 359/308 |
|---|---|---|---|
| 3,701,583 | 10/1972 | Hammond | 359/308 |
| 4,394,060 | 7/1983 | Verber et al. | 385/7 |
| 4,872,746 | 10/1989 | Kobayashi | 359/312 |
| 5,357,097 | 10/1994 | Shiozawa et al. | 250/205 |

FOREIGN PATENT DOCUMENTS

| 409127 | 7/1990 | European Pat. Off. . | |
| 0090957 | 8/1978 | Japan | 359/308 |
| 0316724 | 12/1989 | Japan | 359/287 |

OTHER PUBLICATIONS

Chang et al, "Programmable Acousto–Optic Filter," Ultrasonics Symposium, New Orleans, La. (Sep. 1979), pp. 40–45.

Conroy et al, "Microcomputer–controlled tunable acousto–optic filter," SPIE–Active Optical Devices, vol. 202 (1979), pp.33–39.

A. D'Alessandro, et al., "Multichannel Operation of an Integrated Acousto–Optic Wavelength Routing Switch for WDM Systems", *IEEE Photonics Technology Letters*, vol. 6, No. 3, Mar. 1994, pp. 390–393.

S.E. Harris, et al., "Acousto–Optic Tunable Filter", *Journal of the Optical Society of America*, vol. 59, No. 6, Jun. 1969, pp. 744–747.

*Primary Examiner*—Georgia Y. Epps
*Assistant Examiner*—Evelyn A. Lester
*Attorney, Agent, or Firm*—Ostrolenk, Faber, Gerb & Soffen, LLP

[57] ABSTRACT

Disclosed is a high-speed frequency modulation signal source which has a voltage-controlled oscillator to which a voltage is input to change an oscillation frequency; and a frequency down converter in which a frequency output from the voltage-controlled oscillator is converted into a desired frequency. Also disclosed is a high-speed variable optical wavelength filter which has the above high-speed frequency modulation signal source; a band-pass filter in which a frequency component is extracted from the desired frequency output from the high-speed frequency modulation signal source; and an acousto-optic filter which is driven by the frequency component output from the band-pass filter.

6 Claims, 4 Drawing Sheets

ND HIGH-SPEED
HIGH-SPEED FREQUENCY MODULATION SIGNAL SOURCE AND HIGH-SPEED VARIABLE OPTICAL WAVELENGTH FILTER

FIELD OF THE INVENTION

This invention relates to a high-speed frequency modulation signal source and also relates to high-speed variable optical wavelength filter in which the high-speed frequency modulation signal source is employed.

BACKGROUND OF THE INVENTION

In a conventional frequency modulation signal source, where a desired central frequency output from a signal source is fo and a desired modulation frequency is fm, a voltage with the frequency of fm output from each of two oscillator controllers is input to each of two corresponding voltage-controlled oscillators(VCO's) which can oscillate with the frequency of fo. Herein, a frequency modulation output can be obtained in a modulating speed about one hundredth to about one thousandth of the central frequency fo.

It is known that a light with an optional wavelength can be extracted by inputting the output of the above signal source to an ultrasonic-driving variable optical wavelength filter(S. E. Harris et al.,"Acousto-Optic Tunable Filter", Journal of the Optical Society of America, Vol.59, No.6, pp.744–747(1969)).

The filter center wavelength in an acousto-optic filter is determined by a sine wave signal with a frequency of several hundreds MHz which is externally input. When the frequency(central frequency of about 175 MHz) output from each of the signal sources is changed by several kHz to several MHz, the filter center wavelength in the acousto-optic filter can be changed by 0.01 nm to 0.01 $\mu$m. However, it is difficult for a single VCO to change the output frequency within several ps when the filter center wavelength in the acousto-optic filter is changed at a high speed in the order of ps. Therefore, the two signal sources are employed(A. d'Alessandro et al.,"Multichannel Operation of a Integrated Acousto-Optic Wavelength Routing Switch for WDM Systems", IEEE Photonics Technology Letters, Vol.6, No.3, pp.390–393(1994)).

When a RF or microwave oscillator with an oscillation frequency of f is modulated by a modulating signal with a frequency of fm, the spectrum output therefrom has a central frequency of f with a width of about fm. The RF or microwave oscillator has a characteristic that (output band width)/f (=c)is nearly constant independent of the value of f, wherein the value of c is about hundredth to about thousandth, thereby providing a limitation to the maximum value of the modulation frequency. Therefore, in the conventional oscillator, when RF or microwave with a frequency of fo is modulated by a modulation frequency of fm, a high-speed modulation which satisfies fm>cfo can not be realized since the above limitation, i.e., fm<cfo, exists. Furthermore, the oscillation frequency can not be changed so fast since the change of the oscillation frequency requires a period of about 1/fm even at the minimum.

On the other hand, to change the filter center wavelength of an acousto-optic filter at high speed, the high-speed change of the frequency output from a signal source is needed. The lower limit time for the change of the filter center wavelength which is determined by (size of an acousto-optic filter)/(propagation velocity of surface elastic wave) is in the order of several ps. However, the conventional signal source for driving an acousto-optic filter can not change the output frequency so quickly. If a plurality of signal sources are provided to be switched alternately, then the size of the device must be bigger.

SUMMARY OF THE INVENTION

Accordingly, it is an object of the invention to provide a high-speed frequency modulation signal source in which an output band width is not limited and a frequency modulation and the change of frequency are carried out at high-speed.

It is a further object of the invention to provide a high-speed variable optical wavelength filter in which only one high-speed frequency modulation signal source is employed to reduce the size thereof.

According to the invention, high-speed frequency modulation signal source comprises: a voltage-controlled oscillator to which a voltage is input to change an oscillation frequency; and a frequency down-converter in which a frequency output from the voltage-controlled oscillator is converted into a desired frequency.

According to another aspect of the invention, a high-speed variable optical wavelength filter, comprises: the above high-speed frequency modulation signal source; a band-pass filter in which a frequency component is extracted from the desired frequency output from the high-speed frequency modulation signal source; and an acousto-optic filter which is driven by the frequency component output from the band-pass filter.

The high-speed frequency modulation signal source of the invention functions as described below. From an external oscillator controller, a voltage with a frequency of fm is input to the voltage-controlled oscillator(VCO) outputting a central frequency f(>fo). Since the frequency output from VCO is high, the output band width becomes broad and the upper limit of the modulation frequency is cf(>cfo). The output of VCO is input to the frequency down-converter, where it is divided to provide a desired central frequency fo. In the down-converter, a signal input from VCO can be converted nearly on real time, so that the output signal in which the frequency is changed can be obtained at high speed. Accordingly, the upper limit of the modulation frequency is increased to f/fo times. Furthermore, the lower limit of the switching time of the frequency output from VCO is reduced to fo/f(<1) to provide high-speed switching, while the lower limit of the switching time in the conventional signal source is about 1/fm.

On the other hand, the high-speed variable optical wavelength filter of the invention functions as described below. Since the high-speed frequency modulation signal source can employ VCO with sufficient high output frequency f, the switching time of the frequency output from VCO can be reduced to less than 1 $\mu$s.

Accordingly, the filter center wavelength in the acousto-optic filter can be switched in high-speed operation. In addition, since the high-speed switching operation is performed by only one signal source, the size of the variable optical wavelength filter can be significantly reduced.

BRIEF DESCRIPTION OF THE DRAWINGS

The invention will be explained in more detail in conjunction with the appended drawings, wherein.

DESCRIPTION OF THE PREFERRED EMBODIMENTS

Before explaining a high-speed frequency modulation signal source and high-speed variable optical-wavelength filter in the preferred embodiment, the aforementioned conventional signal source and optical wavelength filter will be explained in FIG. 1.

Figure 1:
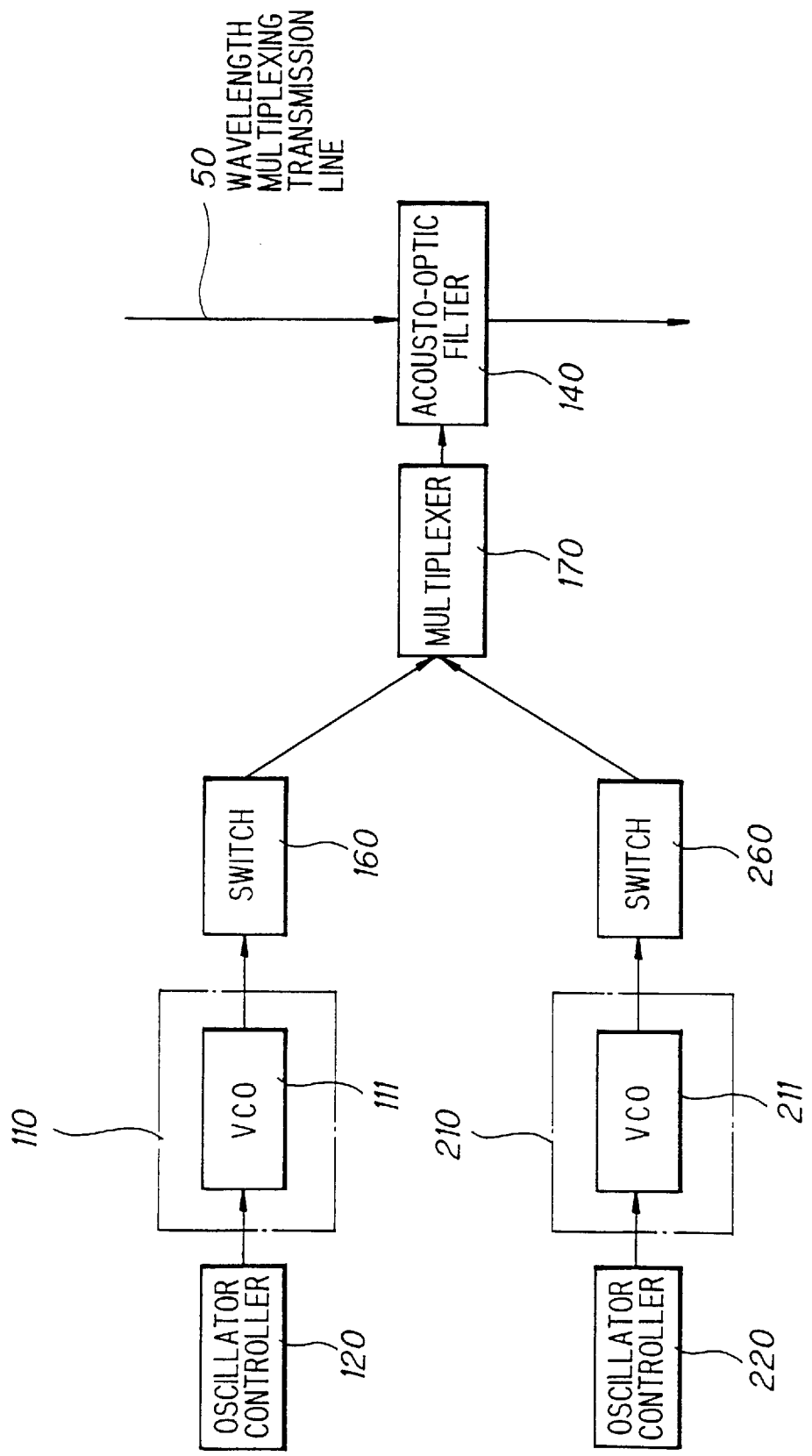
FIG. 1 is a block diagram showing a conventional frequency modulation signal source and variable optical wavelength filter.

As shown in FIG. 1, the conventional variable optical wavelength filter comprises two oscillator controllers 120, 220 which outputs a voltage with the frequency of fm, two VCO's 111, 121 which are signal sources 110, 210 to oscillate with the frequency of fo, two switches 160, 260 for switching into a desired frequency, a multiplexer 170 and an acousto-optic filter 140 for changing a filter center wavelength. Herein, to change the output frequency to the acousto-optic filter 140 within several ps, two signal sources 110, 210 are employed, each of which is turned on by switches 160, 260 to input a desired output frequency to a multiplexer 170, then inputting the output from the multiplexer 170 to the acousto-optic filter 140.

Figure 2:
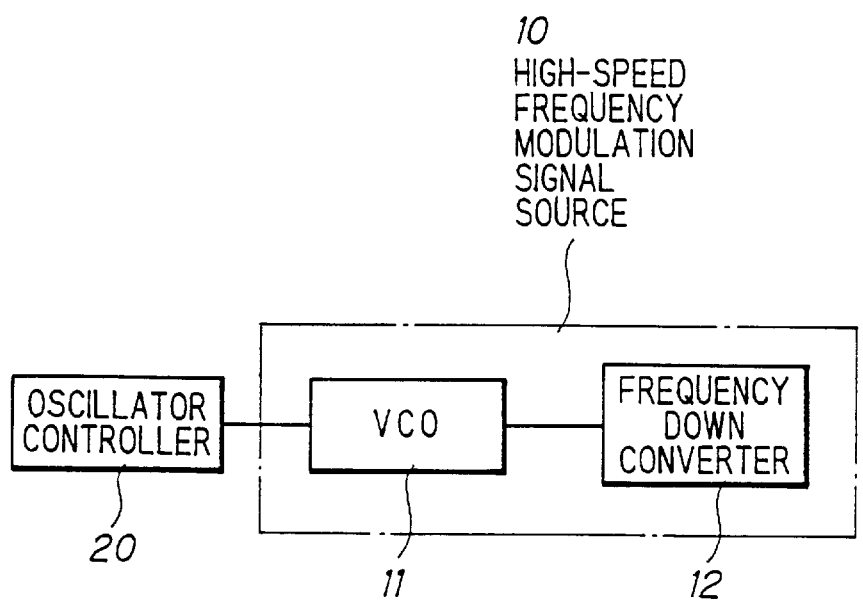
FIG. 2 is a block diagram showing a high-speed frequency modulation signal source in a preferred embodiment according to the invention.

Next, a high-speed frequency modulation signal source 10 in a preferred embodiment of the invention will be explained in FIG. 2.

The high-speed frequency modulation signal source 10 comprises a voltage-controlled oscillator(VCO) 11 and a frequency down-converter 12.

In operation, a voltage output from an oscillator controller 20 is controlled such that a central frequency of about 350 MHz is output from VCO 11. The output of VCO 11 is input to the frequency down-converter 12, where the central frequency is divided into a half, to obtain an output with a frequency of 175 MHz therefrom. Then, the output voltage of the oscillator controller 20 is changed such that the variation of the central frequency output from the oscillator controller 11 is 2 MHz. The time required for the change of the output voltage is only about 10 ns when a function generator is used as the oscillator controller 20, i.e., the changing time can be sufficiently shorter than 1 $\mu$s. Therefore, the central frequency output from VCO 11 is changed for 1 $\mu$s. As a result, the central frequency output from the frequency down converter 12 is changed 1 MHz, and the time required for the change of the central frequency is 1 $\mu$s. Accordingly, it is possible to provide the high-speed frequency modulation signal source 10 in which the central frequency is changed at a speed twice that in the conventional frequency modulation signal source, i.e., 2 $\mu$s.

Figure 3:
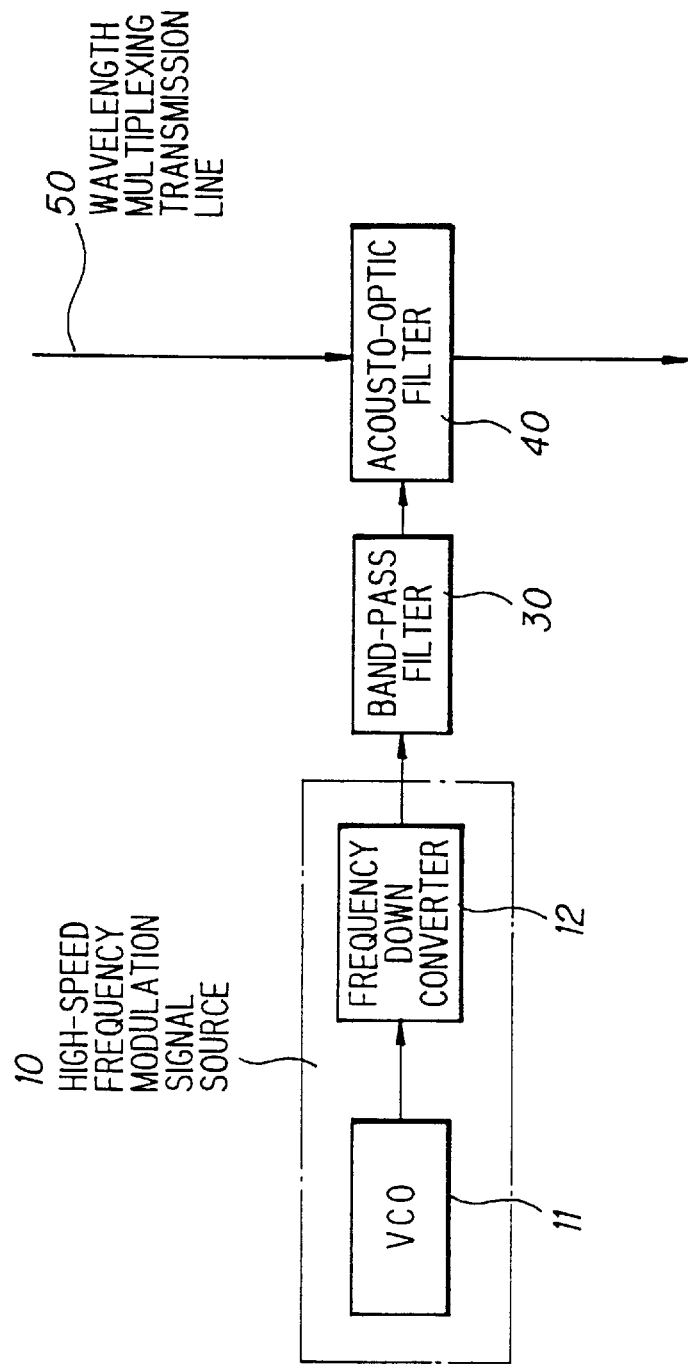
FIG. 3 is a block diagram showing a high-speed variable optical wavelength filter in a preferred embodiment according to the invention.

A high-speed variable optical wavelength filter in a preferred embodiment will be explained in FIG. 3, wherein like parts are indicated by like reference numerals as used in FIG. 2.

The high-speed variable optical wavelength filter comprises a high-speed frequency modulation signal source 10 including a voltage-controlled oscillator(VCO) 11 and a frequency down-converter 12, a band-pass filter 30 and an acousto-optic filter 40. Herein, a filter center wavelength in the acousto-optic filter 40 is determined by a sine wave with a frequency of 175 MHz which is externally input.

Figure 4:
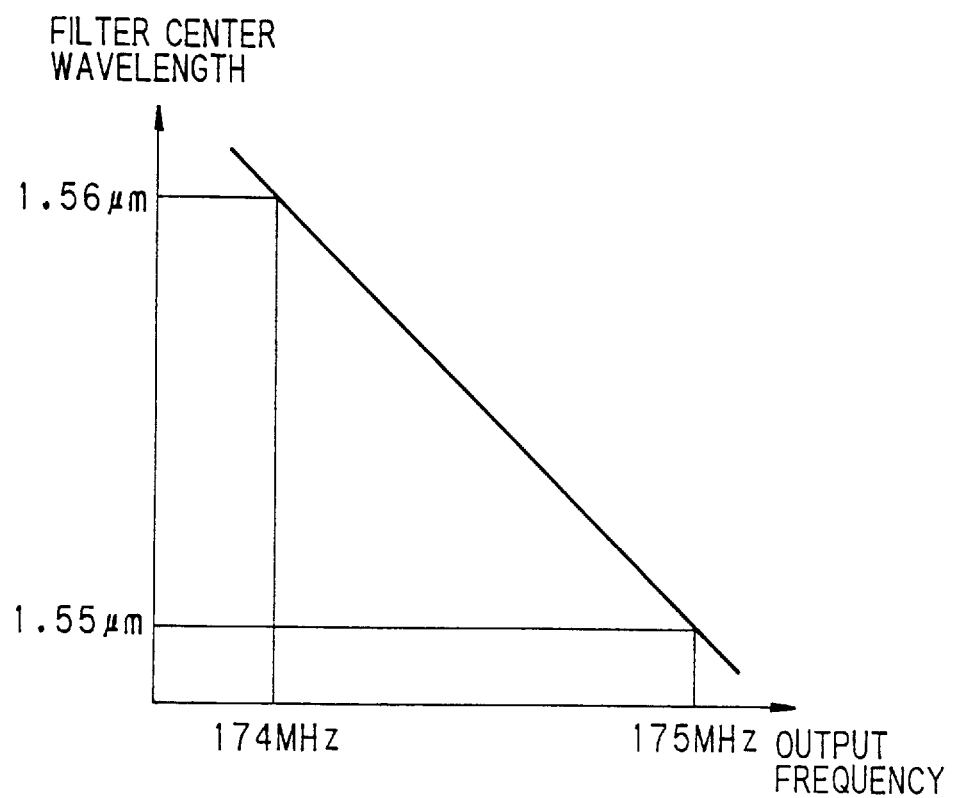
FIG. 4 is a graph showing a relation between a frequency output from a frequency modulation signal source and a filter center wavelength in an acousto-optic filter.

In operation, the output of the high-speed frequency modulation signal source 10 is input to the band-pass filter 30 to remove an unnecessary frequency component. Thereafter, the output of the band-pass filter 30 is input to the acousto-optic filter 40 to drive it. Herein, two laser lights with wavelengths of 1.55 $\mu$m and 1.56 $\mu$m are incident on the acousto-optic filter 40, and laser light with a wavelength of 1.55 $\mu$m is selected by the acousto-optic filter 40, where the output frequency of the high-speed frequency modulation signal source 10 is 175 MHz. Then, as shown in FIG. 4, the output frequency of the high-speed frequency modulation signal source 10 is decreased 1 MHz, i.e., to 174 MHz. Thereby, the filter center wavelength in the acousto-optic filter 40 is increased 0.01 $\mu$m to select the laser light with the wavelength of 1.56 m.

The time required for the change of the central frequency of the high-speed frequency modulation signal source 10, i.e., 1 $\mu$s, is sufficiently shorter than a lower limit time(5 $\mu$s) for the change of the filter center wavelength in the acousto-optic filter 40. Therefore, the filter center wavelength in the acousto-optic filter 40 can be changed by only one high-speed frequency modulation signal source 10 during the lower limit time(5 $\mu$s). The high-speed frequency modulation signal source 10 can be miniaturized to be mounted on a substrate with a size of 5 cm×5cm.

In the above embodiments, the high-speed frequency modulation signal source 10 is designed such that the oscillation frequency of 350 MHz output from the VCO is divided by a half by the frequency down-converter. However, the high-speed frequency modulation signal source may be designed such that RF or microwave with an optional frequency is divided with an optional ratio by the frequency down-converter. The oscillator controller 20 may employ any means for changing a voltage other than a function generator.

On the other hand, the high-speed frequency modulation signal source according to the invention can be used as a high-speed transmission means for a signal with a microwave or RF other means for driving an acousto-optic filter.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A high-speed frequency modulation signal source, comprising:

a voltage-controlled oscillator to which a voltage is input to change an oscillation frequency;

an oscillator controller which outputs said voltage for controlling the oscillation frequency of said voltage controlled oscillator; said controller conducting high-speed modulation of the voltage controlled oscillator so that the voltage controlled oscillator has an output frequency that is switched by said controller in a time period of 1 $\mu$sec or less;

a frequency down-converter in which a frequency output from said voltage-controlled oscillator is converted into a specified frequency.

2. A high-speed frequency modulation signal source, according to claim 1, further comprising:

an oscillator controller which outputs said voltage for controlling said oscillation frequency of said voltage-controlled oscillator.

3. A high-speed frequency modulation signal source, according to claim 2, wherein:

said oscillator controller is a function generator.

4. A high-speed variable optical wavelength filter, comprising:

a high-speed frequency modulation signal source which comprises a voltage-controlled oscillator to which a voltage is input to change an oscillation frequency, an oscillator controller which outputs said voltage for controlling the oscillation frequency of said voltage controlled oscillator; said controller conducting high-speed modulation of the voltage controlled oscillator so that the voltage controlled oscillator has an output frequency that is switched by said controller in a time period of 1 $\mu$sec or less, and a frequency down-converter in which a frequency output from said voltage-controlled oscillator is converted into a specified frequency;

a band-pass filter in which a frequency component is extracted from said specified frequency output from said high-speed frequency modulation signal source; and an acousto-optic filter which is driven by said frequency component output from said band-pass filter.

5. A high-speed variable optical wavelength filter, according to claim 4, further comprising:

an oscillator controller which outputs said voltage for controlling said oscillation frequency of said voltage-controlled oscillator.

6. A high-speed variable optical wavelength filter, according to claim 5, wherein:

said oscillator controller is a function generator.

* * * * *